US012602695B2

(12) United States Patent
Nakatani et al.

(10) Patent No.: US 12,602,695 B2
(45) Date of Patent: Apr. 14, 2026

(54) INFORMATION PROCESSING DEVICE, INFORMATION PROCESSING METHOD, AND STORAGE MEDIUM

(71) Applicant: TOYOTA JIDOSHA KABUSHIKI KAISHA, Toyota (JP)

(72) Inventors: Sho Nakatani, Tokyo (JP); Kenichi Murata, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 167 days.

(21) Appl. No.: 18/398,431

(22) Filed: Dec. 28, 2023

(65) Prior Publication Data

US 2024/0242229 A1    Jul. 18, 2024

(30) Foreign Application Priority Data

Jan. 13, 2023    (JP) ................................. 2023-004105

(51) Int. Cl.
*G06Q 30/015*    (2023.01)
(52) U.S. Cl.
CPC .................................. *G06Q 30/015* (2023.01)
(58) Field of Classification Search
CPC .................................................... G06Q 30/015
USPC ........................................................ 705/304
See application file for complete search history.

(56) References Cited

U.S. PATENT DOCUMENTS

2024/0273587 A1*    8/2024    Zhang .................. G06Q 20/102

FOREIGN PATENT DOCUMENTS

JP        2003-233729 A      8/2003
JP          4607602 B2       1/2011
WO        2004/088947 A1     10/2004

OTHER PUBLICATIONS

"Accountable Plans, Reimbursement and Per-Diem Allowances" Published by Heinonline (Year: 2003).*
OpenID Foundation, "OpenID Connect Core 1.0 incorporating errata set 1", Network Protocol standard issued by OpenID foundation, OpenID Connect Core 1.0 incorporating errata set 1(Nov. 8, 2014 version).

* cited by examiner

*Primary Examiner* — Zeina Elchanti
(74) *Attorney, Agent, or Firm* — SoraIP, Inc.

(57) ABSTRACT

The information processing device transmits a first identifier in response to a user identifier issuance request transmitted from a data consumer, transmits a second identifier in response to a user identifier issuance request transmitted from a data provider, and transmits data. Receiving from the consumer a ticket issuance request including information specifying user data requested by the data consumer, a first identifier, and a data provider to which the request is made, and issuing and issuing a data request ticket corresponding to the ticket issuance request the ticket identifier of the received data request ticket is sent to the data consumer, and when the ticket identifier is received from the data provider, the data request ticket corresponding to the ticket identifier is sent to the data provider.

6 Claims, 5 Drawing Sheets

FIG. 2A

ID CORRESPONDENCE TABLE 120 (PF)

| PF USER ID | DUMMY ID FOR DC | DUMMY ID FOR DP |
|------------|-----------------|-----------------|
| PF_A1 | PF_XX | PF_ZZ |
| ... | ... | ... |

ID CORRESPONDENCE TABLE 240 (DC)

| DC USER ID | DUMMY ID FOR DC |
|------------|-----------------|
| DC_A | PF_XX |
| ... | ... |

ID CORRESPONDENCE TABLE 340 (DP)

| DP USER ID | DUMMY ID FOR DP |
|------------|-----------------|
| DP_A | PF_ZZ |
| ... | ... |

341, 342

DATA REQUEST TICKET STATE TRANSITION DIAGRAM

STATE MANAGEMENT OF DATA REQUEST TICKETS

INFORMATION PROCESSING DEVICE, INFORMATION PROCESSING METHOD, AND STORAGE MEDIUM

CROSS-REFERENCE TO RELATED APPLICATION

This application claims priority to Japanese Patent Application No. 2023-004105 filed on Jan. 13, 2023, incorporated herein by reference in its entirety.

BACKGROUND

1. Technical Field

The present disclosure relates to an information processing device, an information processing method, and a storage medium.

2. Description of Related Art

Japanese Unexamined Patent Application Publication No. 2003-233729 (JP 2003-233729 A) discloses an electronic commerce system that enables purchase and sale of products without transmission of personal information from purchasers to sellers. Specifically, a proxy server transmits a user identifier (ID) to a product information providing server when proxying access to the product information providing server by a client. The product information providing server transmits a product ID and the user ID to the proxy server when receiving a product purchase instruction. Then, the proxy server derives delivery destination information based on the user ID, and transmits the product ID and the delivery destination information to a delivery management server.

SUMMARY

An object of one aspect of the present disclosure is to provide a technology that enables more secure exchange of personal information between a data provider and a data consumer.

One aspect of the present disclosure is an information processing device that mediates exchange of user data between a data consumer and a data provider, including a control unit configured to:

transmit a first identifier in response to a request to issue a user identifier for a user transmitted from the data consumer;

transmit a second identifier in response to a request to issue a user identifier for the user transmitted from the data provider;

receive a ticket issuance request from the data consumer, the ticket issuance request including information that specifies user data requested by the data consumer, the first identifier, and a requested data provider;

issue a data request ticket corresponding to the ticket issuance request;

transmit a ticket identifier of the issued data request ticket to the data consumer; and transmit a data request ticket corresponding to the ticket identifier to the data provider when receiving the ticket identifier from the data provider, in which:

the ticket issuance request includes the first identifier; and the data request ticket transmitted to the data provider includes the second identifier corresponding to the first identifier.

According to the aspect of the present disclosure, exchange of personal information between a data provider and a data consumer can be securely implemented.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2A is a diagram showing an example of an ID correspondence table held by the platform in one embodiment;

FIG. 2B is a diagram showing an example of an ID correspondence table held by a data consumer in one embodiment;

FIG. 2C is a diagram showing an example of an ID correspondence table held by a data provider in one embodiment;

DETAILED DESCRIPTION OF EMBODIMENTS

Figure 1:
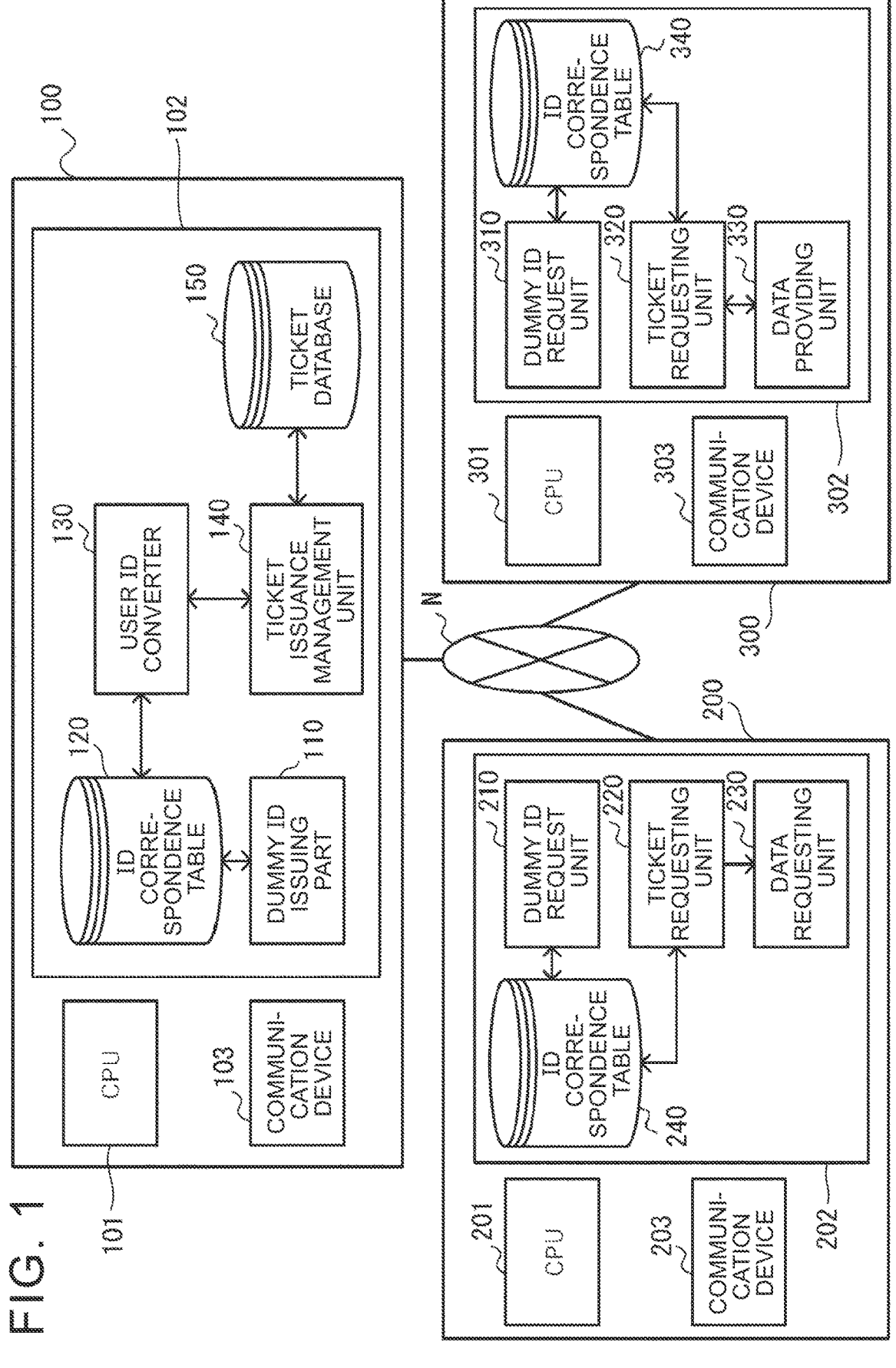
FIG. 1 is a diagram showing a schematic configuration of a data exchange system according to one embodiment.

The value of data has become widely known, and many services are accumulating user data. It is common practice for holders of user data to provide data APIs as data providers in order to provide user data to data consumers.

In such a data exchange system, charging arbitration and prevention of name identification are issues. In this embodiment, a platformer mediates data exchange between a data provider and a data consumer, and the above problem is solved by a novel mediation method.

Note that in this disclosure, platformers, data providers, and data consumers are all terms that refer to devices rather than businesses or individuals. Further, in the present disclosure, the platformer may be referred to as PF, the data provider as DP, and the data consumer as DC.

One embodiment of the present disclosure is an information processing device (platformer; PF) that mediates exchange of user data between a data consumer (DC) and a data provider (DP). A data provider is a device that provides user data, and a data consumer is a device that obtains and uses user data from a data provider.

The PF according to the present embodiment includes a control unit, and the control unit transmits the first identifier in response to a user identifier issuance request to the user transmitted from the DC, and also transmitted from the DP, A second identifier is transmitted in response to a user identifier issuance request to the user. For example, the PF may include a storage unit that associates and stores the first identifier, the second identifier, and the third identifier. The DC holds the first identifier in association with the user identifier and the DP holds the second identifier in association with the user identifier. It should be noted that, even for the same user, generally the user identifiers used in DC and DP are different. For example, by associating and storing a user identifier in DC and a user identifier in DP for a user who performs data exchange, the PF can mutually convert the two user identifiers. At this time, the control unit of the PF does not store the user identifier itself used by the DC and DP, but specifies and stores the user by the dummy identifier issued by the PF. Therefore, the dummy identifier issued by the PF to the DC corresponds to the first identifier, and the dummy identifier issued to the DP by the PF corresponds to the second identifier. The PF issues a PF-specific third identifier corresponding to the pair of the first identifier and the second identifier, and stores the first identifier, the second identifier, and the third identifier in association with each other. Therefore, the PF can convert between these three identifiers. Also, the PF may be configured to be able to derive the first identifier and the second identifier. For example, the control unit of the PF may derive the first identifier by performing conversion processing for DC on the third identifier, and derive the second identifier by performing conversion processing for DP on the third identifier.

The control unit of the PF according to the present embodiment also issues a data request ticket when receiving a ticket issue request for requesting user data from the DC. The ticket issuance request includes information specifying the user data requested by the DC, the first identifier (DC dummy ID), and the DP of the request destination. The issued data request ticket includes, for example, information specifying user data included in the ticket issuance request, and the third identifier stored in association with the first identifier included in the data request. The control unit of the PF then sends the ticket identifier of the issued data request ticket to the DC.

Also, when receiving a ticket identifier from the DP, the control unit of the PF according to the present embodiment transmits a data request ticket corresponding to the ticket identifier to the DP. At this time, the control unit of the PF replaces the third identifier included in the data request ticket with the second identifier (dummy ID for DP) stored in association with the third identifier, and then sends the data request ticket to DP.

In this embodiment, when requesting user data from the DP, the DC first receives a data request ticket issued by the PF and transmits the ticket identifier to the DP to request the user data. By receiving the data request ticket corresponding to the ticket identifier from the PF, the DP can grasp which user's data is requested from the DC, and therefore transmits the data of the user to the DC. Thus, an exchange of user data between DP and DC is established.

In this embodiment, the DC does not receive the user identity at the DP and the DP does not receive the user identity at the DC. Therefore, by making it impossible to guess one of the first identifier and the second identifier from the other, neither the DC nor the DP can associate the user identifier owned by itself with the user identifier owned by the other party, and so-called name identification can be suppressed.

Also, since the PF does not hold user data, even if the PF information is leaked, the user data will not be leaked. In addition, since the PF only holds dummy identifiers of users and does not hold the user identifiers used in the DP and DC, even if the correspondence between the dummy identifiers is known due to information leakage, which user I don't know if the identifiers correspond to each other. From this point of view as well, the present embodiment can prevent name identification.

Also, since the PF can utilize the data request ticket and the access status of the DP and DC to this as evidence for charging or giving incentives, charging arbitration is possible.

The control unit of the PF according to this embodiment may manage the status of the ticket, and notify the DC or DP which is presumed to be the cause when the data exchange does not end normally. Specifically, the control unit of the PF manages the status of the issued ticket according to access from the DC and DP, and the status of the ticket transitions to the next status according to a predefined status transition. If not, it may be specified which of DC or DP is the reason why the transition did not occur, and the specified DC or DP may be notified. The identification of the cause may be performed, for example, based on the trigger of the error state or the transition to the error state.

By doing so, it is possible to identify that the data exchange based on the ticket was not completed normally, and to identify whether the cause lies in the DC or the DP. In addition, the notification can be used to allow data exchange to be performed normally, or to provide an opportunity to prove that the error is not caused by the user itself.

Another embodiment of the present disclosure is an information processing method or a data exchange mediating method performed by the information processing device (PF). Further, another embodiment of the present disclosure can be regarded as a computer program for causing a computer to function as the above information processing device (PF), or a computer program for causing a computer to execute the above information processing method. Other embodiments of the present disclosure can also be viewed as a data exchange system consisting of platformers, data consumers, and data providers.

Hereinafter, embodiments of the present disclosure will be described with reference to the drawings. The configurations of the following embodiments are illustrative, and the present disclosure is not limited to the configurations of the embodiments.

System Configuration

FIG. 1 is a diagram showing the configuration of a data exchange system according to one embodiment. The data exchange system has a configuration in which a platformer (PF) 100, a data consumer (DC) 200, and a data provider (DP) 300 are connected via a network N so as to be able to communicate with each other.

PF 100 is a computer (information processing device) having CPU 101, memory 102 and communication device 103. The memory 102 stores programs executable by the CPU 101. As the CPU 101 executes the program, the PF 100 functions as a dummy ID issuing unit 110, an ID correspondence table storage unit 120, a user ID conversion unit 130, a ticket issuance management unit 140, and a ticket DB 150.

DC 200 is a computer (information processing device) having CPU 201, memory 202 and communication device 203. The memory 202 stores programs executable by the CPU 201. As the CPU 201 executes the program, the DC 200 functions as a dummy ID requesting section 210, a ticket requesting unit 220, a data requesting unit 230 and an ID correspondence table storage unit 240.

DP 300 is a computer (information processing device) having CPU 301, memory 302 and communication device 303. The memory 302 stores programs executable by the CPU 301. The DP 300 functions as a dummy ID requesting section 310, a ticket requesting unit 320, a data providing unit 330 and an ID correspondence table storage unit 340 by the CPU 301 executing the program.

Details of each of the above functional units will be described later in detail with reference to other drawings. Some or all of the above functional units may be implemented by dedicated circuits or devices.

Network N is a network composed of a wired communication network and/or a wireless communication network, and communication device 103, communication device 203, and communication device 303 can communicate with each other via network N.

(ID Correspondence Table)

FIGS. 2A to 2C are diagrams showing examples of ID correspondence tables held by the PF 100, DC 200, and DP 300, respectively. Here, the same user has an account in both DC 200 and DP 300, the user ID in DC 200 (hereinafter also referred to as DC user ID) is DC_A, and the user ID in DP 300 (hereinafter referred to as DP user ID) is DP_A. Also, the PF 100 assigns a user ID PF_A1 (hereinafter also referred to as a PF user ID) to this user and manages it.

As shown in FIG. 2A, the PF 100 issues a DC dummy ID 122 and a DP dummy ID 123 for one PF user ID 121, associates them, and manages them. Therefore, by referring to the ID correspondence table 120, the user ID conversion unit 130 mutually converts the PF user ID (third identifier), the DC dummy ID (first identifier), and the DP dummy ID (second identifier). It is convertible.

As shown in FIG. 2B, the DC 200 associates and manages a DC user ID 241 and a DC dummy ID 242 issued to the user by the PF 100. Therefore, the DC 200 can mutually convert the DC user ID and the DC dummy ID (first identifier).

As shown in FIG. 2C, the DP 300 associates and manages a DP user ID 341 and a DP dummy ID 342 issued to the user by the PF 100. Therefore, the DP 300 can mutually convert the DP user ID and the DP dummy ID (second identifier).

In the example shown in FIGS. 2A to 2C, specifically, the PF 100 issues a dummy ID PF_XX for the DC 200 and a dummy ID PF_ZZ for the DP 300 to the user PF_A1, and store them in association with each other. The DC 200 associates and stores the user ID DC_A and the DC dummy ID PF_XX. The DP 300 associates and stores the user ID DP_A and the DP dummy ID PF_ZZ.

When the PF 100 receives the DC dummy ID from the DC 200, the PF 100 can obtain the DP dummy ID of the user and notify the DP 300 of it. Since each device has such an ID correspondence table, it is possible to identify users between the DC 200 and the DP 300 via the PF 100 without each device knowing the user ID in other services. Note that the PF 100 may store only the correspondence between the DC dummy ID and the DP dummy ID without using the PF user ID.

The dummy ID is issued by the dummy ID issuing unit 110, the dummy ID requesting unit 210, and the dummy ID requesting unit 310 in cooperation. The details of this dummy ID issuing process will be described later with reference to FIG. 4.

(Data Exchange Processing)

Figure 3:
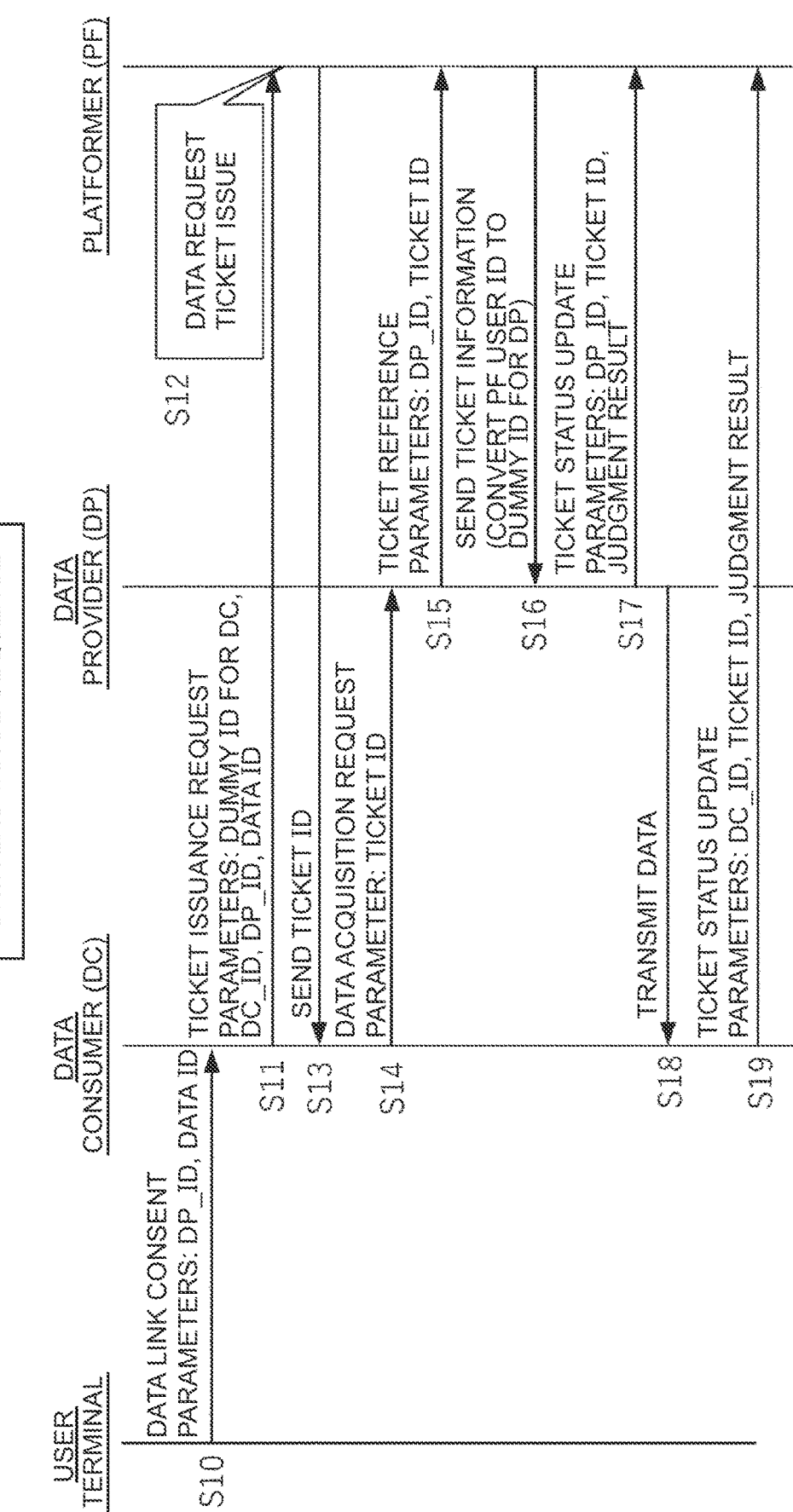
FIG. 3 is a sequence diagram showing data exchange processing in one embodiment.

FIG. 3 is a sequence diagram showing the flow of user data exchange processing between the DC 200 and the DP 300 via the PF 100. Here, it is assumed that the dummy ID issuing process has been completed, and that the PF 100, DC 200, and DP 300 each hold the ID correspondence tables shown in FIGS. 2A to 2C. It is also assumed that the user has completed the authentication process at the DC 200 and that the DC 200 knows that the user's user ID is DC_A.

At S10, a user accesses DC 200 using a user terminal and requests that DC 200 obtain some kind of user data from DP 300. Here, an identifier (DP_ID) of the DP 300 that provides data and an identifier (data ID) representing the type of data are given to the DC 200 from the user terminal.

In S11, the ticket requesting unit 220 of the DC 200 requests the PF 100 to issue a data request ticket for use in exchanging user data between the DC 200 and the DP 300.

Here, the ticket issuance request includes the DC dummy ID, the identifier (DC_ID) of the DC 200, the identifier (DP_ID) of the DP 300 to which the data is requested, and the data ID. The DC dummy ID is obtained when the ticket requesting unit 220 refers to the ID correspondence table storage unit 240 and obtains the dummy ID corresponding to the DC user ID. Here, the dummy ID "PF_XX" corresponding to the DC user ID "DC_A" is obtained. Also, the DC_ID is the own ID, so it is known, and the DP_ID and the data ID are notified from the user terminal.

In S12, the ticket issuance management unit 140 of the PF 100 issues a data request ticket and stores the ticket information in the ticket DB 150. A data request ticket includes a ticket ID, a PF user ID, a DC_ID of a data requester, a DP_ID of a data requestee, a data ID representing the type of requested data, and a ticket status. Here, the user ID conversion unit 130 can acquire the PF user ID from the DC dummy ID notified from the DC 200 and the ID correspondence table 120. Here, the PF user ID "PF_A1" corresponding to the DC dummy ID "PF_XX" is obtained.

At S13, the ticket issuance management unit 140 of the PF 100 transmits the ticket ID of the issued data request ticket to the DC 200.

At S14, the data requesting unit 230 of the DC 200 transmits a data acquisition request to the DP 300. Specifically, the data requesting unit 230 transmits the ticket ID transmitted from the PF 100 in S13 to the DP 300 as a data acquisition request.

At S15, the ticket requesting unit 320 of the DP 300 transmits the DP_ID and the ticket ID to the PF 100 to request details of the data request ticket.

At S16, the ticket issuance management unit 140 of the PF 100 acquires the detailed information of the data request ticket corresponding to the received ticket ID from the ticket DB 150 and transmits it to the DP 300. At this time, the ticket issuance management unit 140 replaces the PF user ID included in the data request ticket with the DP dummy ID using the user ID conversion unit 130, and then transmits the detailed information of the data request ticket. Specifically, the PF user ID "PF_A1" is replaced with the DP dummy ID "PF_ZZ". Here, the ticket issuance management unit 140 changes the state of the ticket as the ticket is referred to by the DP 300.

In S17, the data providing unit 330 of the DP 300 refers to the detailed information of the data request ticket and determines whether the requested user data can be provided to the DC 200. The determination result is either available or not available, that is, accept or reject the data request ticket. The data providing unit 330 transmits this determination result to the PF 100. The ticket issuance management unit 140 of the PF 100 changes the state of the ticket according to the acceptance or rejection of the ticket by the DP 300.

Steps after S18 are performed when the DP 300 accepts the ticket. At S18, the data providing unit 330 of the DP 300 transmits the user data specified in the data request ticket to the DC 200. In the data request ticket, the user is indicated by a DP dummy ID, but the DP 300 can obtain the corresponding DP user ID by referring to the ID correspondence table 340, and can identify whether the user data of which user is requested. Specifically, it is possible to identify that the DP dummy ID "PF_ZZ" is the DP user ID "DP_A".

In S19, when the data request unit 230 of the DC 200 receives the user data from the DP 300, it determines whether to accept or reject the user data, and transmits the determination result to the PF 100. The ticket issuance management unit 140 of the PF 100 changes the state of the ticket according to acceptance or rejection of user data by the DC 200. When the DC 200 receives user data, the DC 200 executes processing using the user data. What kind of processing is executed is not particularly limited in the present disclosure.

By the above processing, user data can be exchanged without the DC 200 knowing the user ID in the DP 300 and the DP 300 without knowing the user ID in the DC 200. In addition, the PF 100 can mediate data exchange without holding the user data itself or holding the user IDs in the DC 200 and the DP 300. For these reasons, secure data exchange is achieved.

(Dummy ID Issuing Process)

Figure 4:
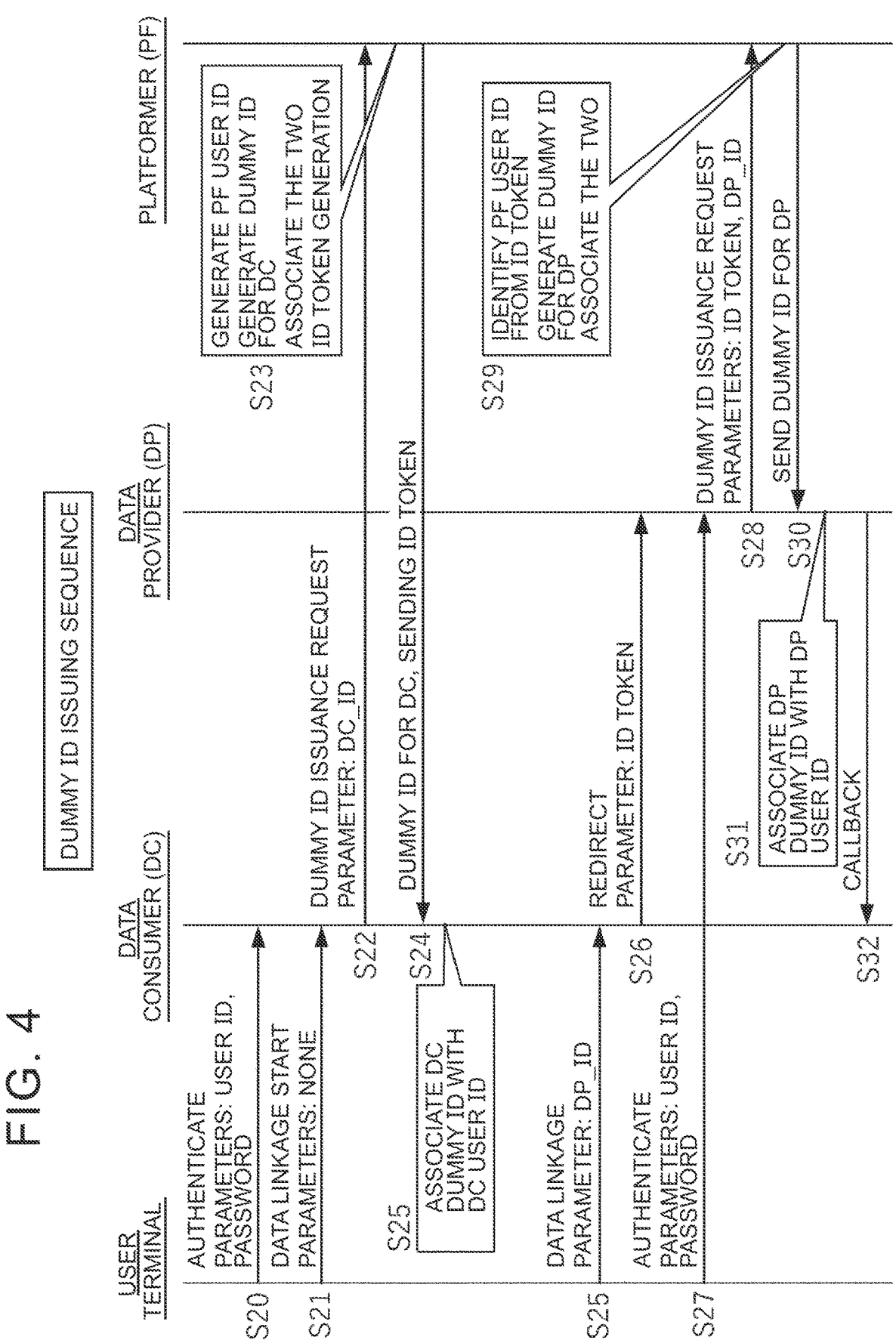
FIG. 4 is a sequence diagram showing dummy ID issuing processing in one embodiment.

The dummy ID issuing process will be described with reference to FIG. 4. Note that the dummy ID issuing process described here, that is, the process of associating unique user IDs and dummy IDs in the PF 100, DC 200, and DP 300, is merely a specific example. I don't mind if it's done.

At S20, the user is authenticated by the DC 200 using the user terminal. At this point, DC 200 knows the user's DC user ID (e.g. DC_A). When the user terminal requests the DC 200 to start data linkage processing in S21, the dummy ID requesting unit 210 of the DC 200 requests the PF 100 to issue a dummy ID in S22. Here, the information sent from DC 200 to PF 100 is the DC identifier and no DC user ID is sent.

In S23, the dummy ID issuing unit 110 of the PF 100 newly generates a PF user ID and a DC dummy ID, associates them, and stores them in the ID correspondence table 120. The dummy ID issuing unit 110 also newly issues an ID token and manages the ID token in association with the PF user ID and the DC dummy ID. In S24, the dummy ID issuing unit 110 transmits the issued DC dummy ID and ID token to the DC 200. In S25, the dummy ID requesting unit 210 of the DC 200 stores the received DC dummy ID in the ID correspondence table 240 in association with the DC user ID.

In S25, the user terminal transmits to the DC 200 a data linkage request including the identifier of the DP 300 of the data linkage destination. At step 26, the DC 200 redirects to the DP 300 passing the ID token received at S24. At S27, the user is authenticated by the DP 300 using the user terminal. At this point, DP 300 knows the user's DP user ID (e.g. DP_A).

In S28, the dummy ID request unit 310 of the DP 300 requests the PF 100 to issue a dummy ID. Here, the DP identifier and the ID token are sent from the DP 300 to the PF 100, but the DP user ID is not sent.

In S29, the dummy ID issuing unit 110 of the PF 100 can grasp from the ID token for which PF user ID and DC dummy ID the DP dummy ID issuance request. The dummy ID issuing unit 110 newly issues a dummy ID for DP and stores it in the ID correspondence table 120 in association with the PF user ID and the dummy ID for DC. In S30, the dummy ID issuing unit 110 transmits the issued dummy ID for DP to the DP 300. In S31, the dummy ID requesting unit 310 of the DP 300 stores the received DP dummy ID in the ID correspondence table 340 in association with the DP user ID. At S32, the DP 300 calls back to the DC 200 and control of the user terminal returns to the DC 200.

As described above, the issuing and sharing of dummy IDs for the user IDs of PF 100, DC 200, and DP 300 as shown in FIGS. 2A to 2C are completed. At this time, since the PF user ID, DC user ID, and DP user ID are not notified to other devices, it is possible to prevent account association.

In another embodiment, the PF 100 may generate the DC dummy ID and the DP dummy ID as ciphertext obtained by encrypting the PF user ID using the DC 200 and DP 300 encryption keys. For example, the dummy ID issuing unit 110 newly generates a PF user ID in response to a new dummy ID issuance request from a DC, and encrypts (converts) the PF user ID using a DC encryption key to generate a DC dummy ID (first identifier). Further, in response to a dummy ID issuance request from the DP, the dummy ID issuing unit 110 encrypts (converts) the PF user ID specified by the ID token using the DP encryption key, thereby generating a user ID (second identifier) for DP. Further, the user ID conversion unit 130 performs decryption processing (reverse conversion processing) using the DC encryption key on the DC user ID, and then encrypts the DC user ID (conversion processing) using the DP encryption key, a DP user ID corresponding to the DC user ID can be obtained. Conversion from a DP user ID to a DC user ID is similar. In this way, the PF 100 can mutually convert the DC dummy ID, the DP dummy ID, and the PF user ID without holding the DC dummy ID and the DP dummy ID. In this embodiment, it is possible to prevent leakage of the correspondence table of the PF user ID, the DC user ID, and the DP user ID based on the premise that the secret of the encryption key is maintained.

Further, the dummy ID issuing unit 110 may use the PF user ID (third identifier) itself as the DC dummy ID (first identifier) and the DP dummy ID (second identifier). In this example, the collusion between the DC and the DP has the disadvantage of allowing direct data exchange without the mediation of the PF, but safe data exchange between the DC and the DP is possible.

(Ticket Status Management and Error Notification)

Figure 5A:
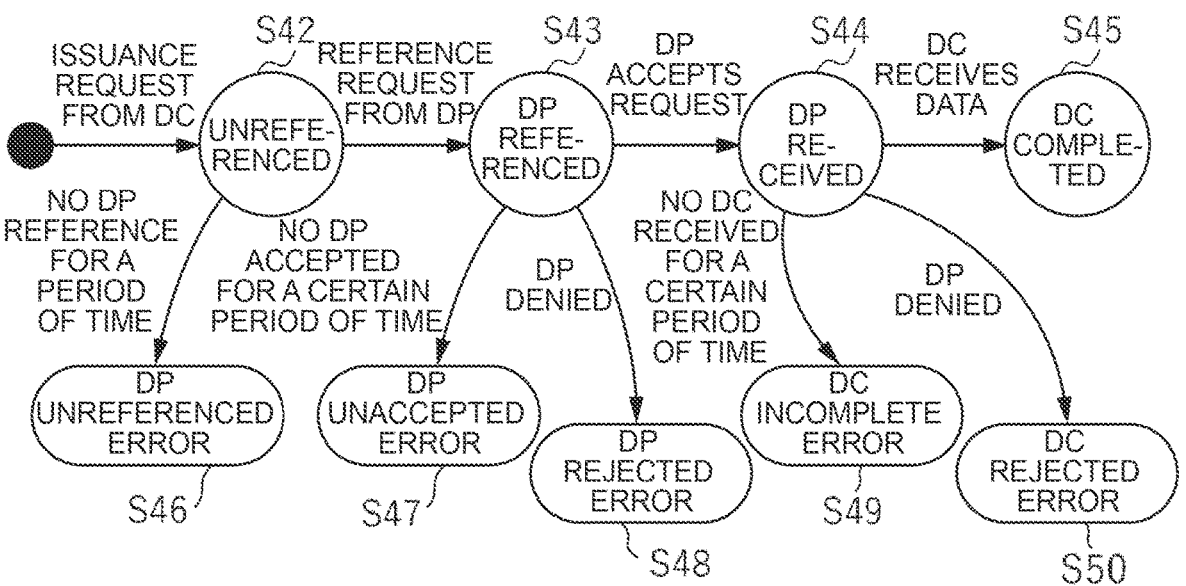
FIG. 5A is a state transition diagram of a data request ticket in one embodiment.
Figure 5B:
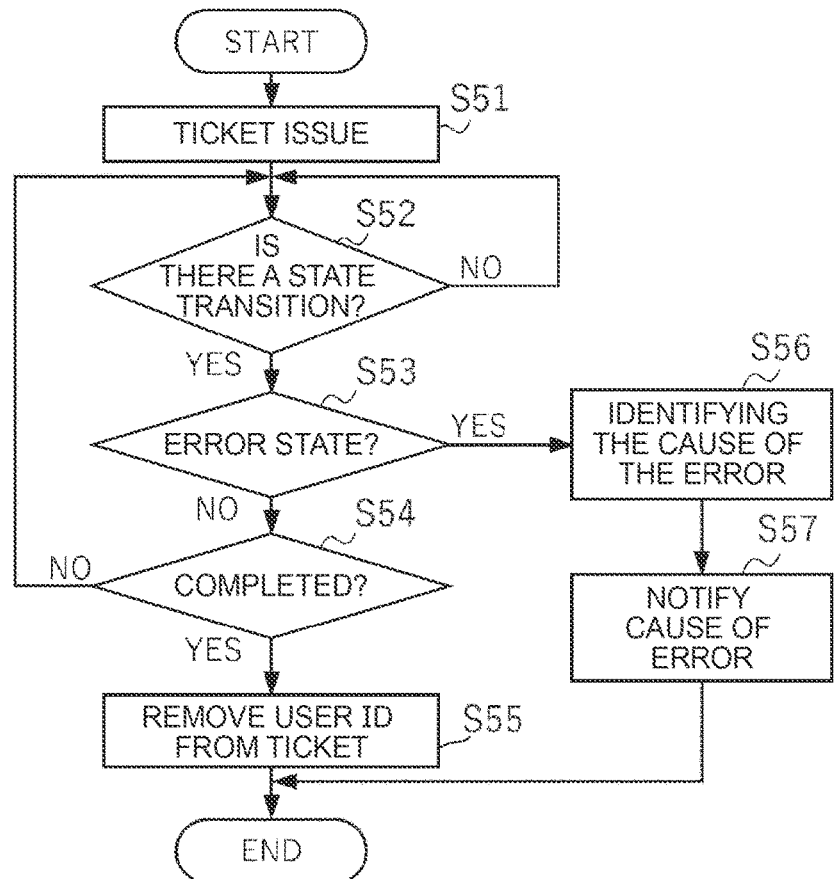
FIG. 5B is a flowchart of a data request ticket state management process in one embodiment.

With reference to FIGS. 5A and 5B, data request ticket status management and notification processing when data exchange is not completed normally will be described. FIG. 5A is a state transition diagram of the data request ticket, and FIG. 5B is a flowchart showing state management processing of the data request ticket.

As shown in FIG. 5A, when the data request ticket is issued in response to a request from the DC 200, it enters the unreferenced state S42, and when there is a reference request from the DP 300 (S15 in FIG. 3), it transits to the DP referred state S43. When the DP 300 accepts the request (S17), it transits to the DP received state S44, and when the DC 200 accepts the user data (S19), it transits to the DC completed state S45. Further, if there is no reference request from the DP 300 for a certain period of time in the unreferenced state S42, the state transitions to the DP unreferenced error state S46. In the DP referred state S43, if there is no DP acceptance notification for a certain period of time, the DP unaccepted error state S47 is entered, and if the DP 300 rejects the DP, the DP rejected error state S48 is entered. In the DP received state S44, if there is no notification of acceptance from the DC 200 for a certain period of time, the state transitions to the DC incomplete error state S49, and if the DC 200 refuses, the state transitions to the DC rejection error state S50.

As shown in FIG. 5B, after issuing the data request ticket in S51, the ticket issuance management unit 140 monitors in S52 whether an event causing a ticket state transition has occurred. When the ticket state transitions, the ticket issuance management unit 140 determines whether the transition destination state is an error state (S53) or a DC completed state (S54). If the transition destination state is neither an error state nor a DC completed state, the process returns to S52 to wait for the next state transition.

When transitioned to the DC completed state (S54-YES), the ticket issuance management unit 140 deletes or empties the PF user ID from the record of the ticket in the ticket DB 150. As a result, the association between the ticket and the user can be canceled, and the risk of information leakage can be reduced. The same effect can be obtained by encrypting the PF user ID with a salt (random number) instead of deleting the PF user ID.

If the transition destination state is one of the error states (S53-YES), the ticket issuance management unit 140 identifies in S56 whether the cause of the error is DC 200 or DP 300, and in S57 Notify the cause party. The cause of the error may be defined in advance in association with the error state. For example, define DP rejected error state S48 and DC not completed error state S49 to be caused by DC 200, and DP unreferenced error state S46, DP not accepted error state S47, and DC rejected error state to be caused by DP 300. Note that this definition is only an example.

By notifying the cause of the error from the PF 100, the DC 200 or DP 300 that received the notification can eliminate the cause of the error and proceed with the process again. Alternatively, DC 200 or DP 300 may prove to PF 100 that it is not the cause of the error. By notifying the DC 200 or DP 300 that is presumed to be the cause of the error in this way, it is possible to provide an opportunity to eliminate the cause of the error and an opportunity to submit evidence for counterargument.

PF 100 may also use the data request ticket status for billing and giving incentives. Specifically, when the data request ticket correctly transitions to the DC completed state, the PF 100 determines that the data exchange has been correctly completed, performs charging processing for the DC 200, and gives incentives to the DP 300.

(Billing Process)

PF 100 may also broker incentives based on completed data request tickets. For example, the PF 100 extracts completed data request tickets for each specific pair of DC and DP at regular intervals (for example, daily or monthly), performs aggregation processing on the extracted ticket group, Determine the total amount of incentives according to the aggregated results. PF 100 reports to DC 200 and DP 300 the total incentive amount and its calculation results. Incentives from DC 200 to DP 300 may or may not be provided through PF 100.

The incentive total amount may be determined according to the number of data requests (the number of tickets), or may be determined according to the transmission data size. When using the transmitted data size, it is preferable to store the transmitted data size in the data request ticket. Also, in calculating the total incentive amount, weighting may be performed according to the data category. The data category may be obtained from the data ID, or may be stored separately in the ticket.

(Customer Consent Management)

When the DC 200 acquires user data from the DP 300, it is necessary to clearly indicate to the user how the data will be used and obtain the user's consent. Here, user consent management may be performed by the PF 100 instead of the DC 200. For example, when the PF 100 issues a data request ticket to the DC 200, the PF 100 may present to the user a contract specifying the use of the data, and issue the data request ticket after obtaining the user's consent. The above rules may be obtained by the PF 100 from the DC 200, or may be created independently by the PF 100. With the PF 100 managing the consent of the user in this way, it is possible to confirm what is wrong with the user in the process of issuing the data request ticket in a one-stop manner.

Advantageous Effect of This Embodiment

User data can be exchanged without the DC 200 knowing the user ID at the DP 300 and the DP 300 without knowing the user ID at the DC 200. In addition, the PF 100 can mediate data exchange without holding the user data itself or holding the user IDs in the DC 200 and the DP 300. For these reasons, secure data exchange is achieved. In addition, billing processing and error handling processing can also be performed based on the state management of the data request ticket.

OTHER EMBODIMENTS

The above-described embodiment is merely an example, and the present disclosure may be appropriately modified and implemented without departing from the scope thereof.

The present disclosure can also be implemented by supplying a computer with a computer program that implements the functions described in the above embodiment, and causing one or more processors of the computer to read and execute the program. Such a computer program may be provided to the computer by a non-transitory computer-readable storage medium connectable to the system bus of the computer, or may be provided to the computer via a network. The non-transitory computer-readable storage medium is, for example, a disc of any type such as a magnetic disc (floppy (registered trademark) disc, HDD, etc.) and an optical disc (compact disc read-only memory (CD-ROM), digital versatile disc (DVD), Blu-ray disc, etc.), a ROM, a RAM, an EPROM, an electrically erasable programmable read only memory (EEPROM), a magnetic card, a flash memory, an optical card, and any type of medium suitable for storing electronic commands.

What is claimed is:

1. A non-transitory storage medium storing a program for causing a computer to execute steps of the information processing method, the method comprising:

transmitting a first identifier in response to a request to issue a user identifier for a user transmitted from a data consumer (DC);

transmitting a second identifier in response to a request to issue a user identifier for the user transmitted from a data provider (DP);

storing, in association, the first identifier, the second identifier, and a third identifier, the first identifier, the second identifier, and the third identifier corresponding to a same user;

receiving a ticket issuance request from the DC, the ticket issuance request including information specifying user data requested by the DC, the first identifier, and an identifier of the requested DP;

issuing a data request ticket corresponding to the ticket issuance request, the data request ticket including the third identifier stored in association with the first identifier, the third identifier being associated with the first identifier and the second identifier;

transmitting a ticket identifier of the issued data-request ticket to the DC;

transmitting the data request ticket to the DP in response to receiving, from the DP, the ticket identifier of the data request ticket, the transmitting including replacing the third identifier included in the data request ticket with the second identifier corresponding to the first identifier;

managing a state of the data-request ticket in accordance with access from the DC and the DP;

identifying which of the DC and the DP is a cause of an error when the state of the data-request ticket has transitioned to an error state;

notifying the DC or DP that has been identified; and deleting or encrypting the third identifier included in the data-request ticket in response to determining that the data-request ticket has transitioned to a data-consumer-completed state.

2. The non-transitory storage medium storing a program for causing a computer to execute steps of the information processing method according to claim 1, the method further comprising not retaining the user identifier in the data consumer, the user identifier in the data provider, and the user data.

3. An information processing device that mediates exchange of user data between a data consumer (DC) and a data provider (DP), the information processing device comprising:

a communication device configured to communicate with the DC and the DP via a network;

a storage unit configured to store, in association, a first identifier issued to the DC, a second identifier issued to the DP, and a third identifier, the first identifier, the second identifier, and the third identifier corresponding to a same user; and a control unit including a processor and a memory storing instructions that cause the processor to execute processes comprising:

transmitting, by the communication device, the first identifier in response to a request to issue a user identifier for a user transmitted from the DC;

transmitting, by the communication device, the second identifier in response to a request to issue a user identifier for the user transmitted from the DP;

receiving, by the communication device, a ticket issuance request from the DC, the ticket issuance request including information that specifies user data requested by the DC, the first identifier, and an identifier of the requested DP;

issuing, by the control unit, a data request ticket corresponding to the ticket issuance request, the data request ticket including the third identifier stored in association with the first identifier, the third identifier being associated with the first identifier and the second identifier in the storage unit;

transmitting, by the communication device, a ticket identifier of the issued data request ticket to the DC;

in response to receiving, from the DP, the ticket identifier of the data request ticket, transmitting, by the communication device, the data request ticket to the DP after replacing the third identifier included in the data request ticket with the second identifier corresponding to the first identifier stored in the storage unit;

managing, in the storage unit, a state of the data request ticket in accordance with access from the DC and the DP;

identifying which of the DC and the DP is a cause of an error in a case where the state of the data request ticket has transitioned to an error state;

notifying the DC or the DP that has been identified; and deleting or encrypting, in the storage unit, the third identifier included in the data request ticket in response to determining that the data request ticket has transitioned to a data consumer completed state.

4. The information processing device according to claim 3, wherein the information processing device does not retain the user identifier in the data consumer, the user identifier in the data provider, and the user data.

5. An information processing method performed by an information processing device that mediates exchange of user data between a data consumer (DC) and a data provider (DP), the information processing method comprising:

a first identifier issuance step of transmitting a first identifier in response to a request to issue a user identifier for a user transmitted from the DC;

a second identifier issuance step of transmitting a second identifier in response to a request to issue a user identifier for the user transmitted from the DP;

a storage step of storing, in association, the first identifier issued to the DC, the second identifier issued to the DP, and a third identifier in a storage unit, the first identifier, the second identifier, and the third identifier corresponding to a same user;

a reception step of receiving a ticket issuance request from the DC, the ticket issuance request including information that specifies user data requested by the DC, the first identifier, and an identifier of the requested DP;

an issuance step of issuing a data request ticket corresponding to the ticket issuance request, the data request ticket including the third identifier stored in association with the first identifier, the third identifier being associated with the first identifier and the second identifier in the storage unit;

a ticket identifier transmission step of transmitting a ticket identifier of the issued data request ticket to the DC;

a transmission step of transmitting the data request ticket to the DP in response to receiving, from the DP, the ticket identifier of the data request ticket, transmitting including replacing the third identifier included in the data request ticket with the second identifier corresponding to the first identifier;

a ticket state management step of managing, in the storage unit, a state of the data request ticket in accordance with access from the DC and the DP;

an error identification step of identifying which of the DC and the DP is a cause of an error in a case where the state of the data request ticket has transitioned to an error state;

a notification step of notifying the DC or the DP that has been identified as the cause of the error; and a deletion or encryption step of deleting or encrypting, in the storage unit, the third identifier included in the data request ticket in response to determining that the data request ticket has transitioned to a data consumer completed state.

6. The information processing method according to claim 5, further comprising a non-retaining process of not retaining the user identifier in the data consumer, the user identifier in the data provider, and the user data.

* * * * *